(No Model.)
D. G. HADLEY.
SAW TOOTH SWAGE.
No. 357,595. Patented Feb. 15, 1887.
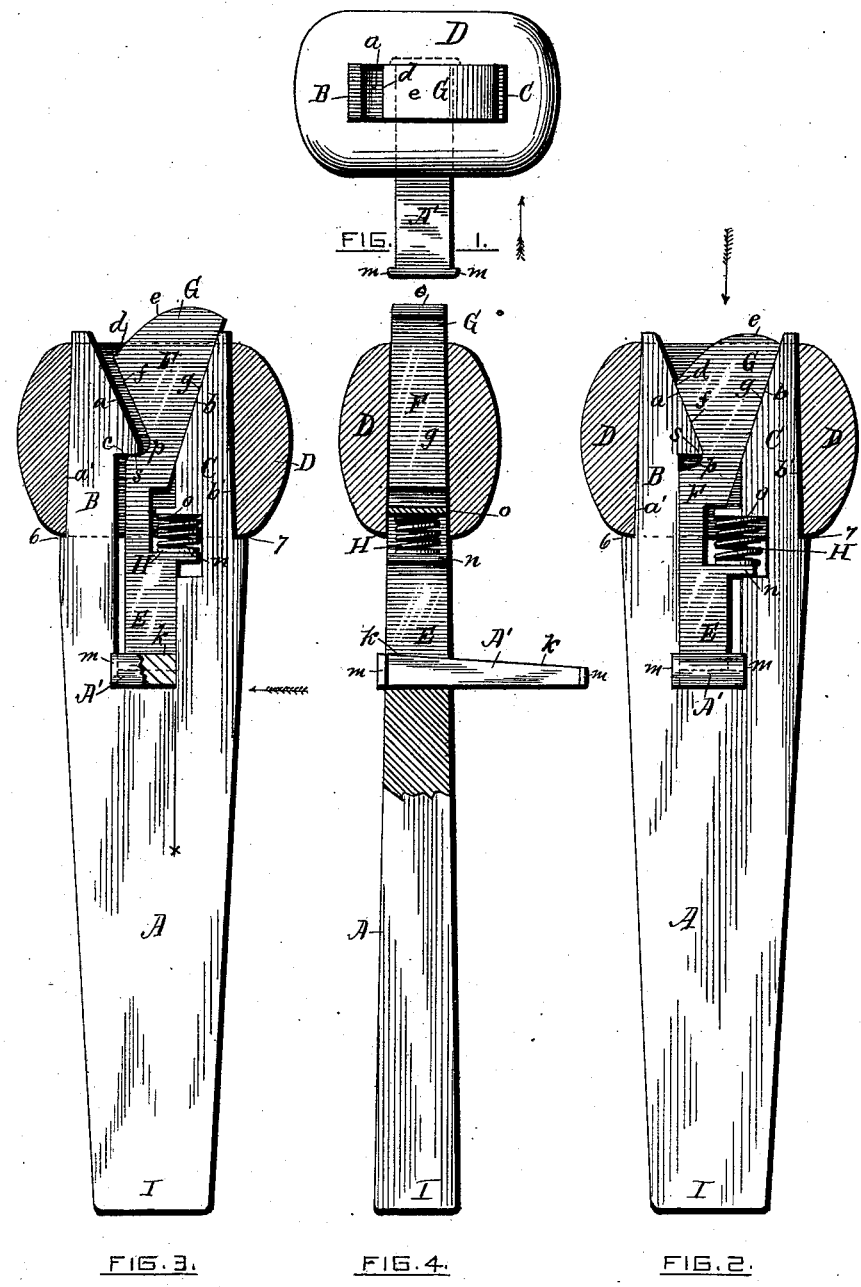
WITNESSES:
INVENTOR:
Dana G. Hadley

UNITED STATES PATENT OFFICE.

DANA G. HADLEY, OF FITCHBURG, MASSACHUSETTS.

SAW-TOOTH SWAGE.

SPECIFICATION forming part of Letters Patent No. 357,595, dated February 15, 1887.

Application filed November 12, 1886. Serial No. 218,726. (No model.)

*To all whom it may concern:*

Be it known that I, DANA G. HADLEY, of Fitchburg, in the county of Worcester and Commonwealth of Massachusetts, have invented certain new and useful Improvements in Saw-Tooth Swages; and I do hereby declare the following to be a full, clear, and exact description of the same, reference being had to the accompanying drawings, forming a part of this specification, and in which—

Figure 1 represents an end view of the device complete, looking in the direction indicated by the arrow, Fig. 2. Fig. 2 represents a side view looking in the direction indicated by the arrow, Fig. 1, the holding head or clamp being shown in section, and the adjustable swaging-die being shown depressed to its lowest position, as will be hereinafter described. Fig. 3 represents a similar side view, the holding head or clamp being shown in section and a part of one end of the jaw or die-adjusting wedge being broken off, all for the purpose of showing the position of the parts more fully, the adjustable die or swaging-jaw being shown raised to its highest position, all as will be hereinafter described. Fig. 4 represents a section, indicated by line $x$, Fig. 3, looking in the direction of the arrow, same figure, the adjustable swaging jaw or die being shown in elevation; and Fig. 5 represents a top or plan view of the jaw or die adjusting wedge, the same being detached.

To enable those skilled in the art to which my invention belongs to make and use the same, I will describe the invention more in detail.

As saw-tooth swages have heretofore been made, it has been necessary to file off the point of the tooth after the swaging operation has been completed, in order to give the tooth the proper sharpness and form. This operation renders the tooth less durable, since the "case-hardening" of the surface of the point of the tooth due to the swaging operation is removed by the filing operation, and the tooth is left comparatively soft, and consequently far less durable and effective.

By my invention the necessity of filing is obviated, and other important advantages are obtained.

In the drawings the part marked A is the handle or stock, the upper end terminating in jaws B and C, the inner faces of said jaws inclining inwardly, as shown at $a$ and $b$, from their upper ends downward to the notch or shoulder $c$ on jaw B. The outer edges, $a'$ and $b'$, of jaws B and C incline out slightly from their upper ends down to their shoulders 6 and 7, so that when the head or clamp D is forced down in position against shoulders 6 and 7, as shown in the drawings, there will be a tight and firm fit of the parts, the inner edges of the opening in the head or clamp D being made, by preference, with corresponding inclinations.

Between the jaws B C is arranged a movable or adjustable die or swage, F, its upper end, G, having a corner, $d$, rounded top $e$, and inclined or beveled edges $f$ and $g$, to fit the beveled edges $a$ and $b$ of the jaws B and C, as shown in Fig. 2. The lower end, E, of the swage or die F rests upon the upper inclined surface, $k$, of the wedge A', which is provided with shoulders $m$ $m$ at each end, to prevent its displacement, said wedge A' being placed in position before die or swage F and its spring H are put in, the latter being held in place by clamp D.

The inner edge of jaw C is cut out, as shown in the drawings, to receive spring H, the lower end of which rests upon the upper surface of the projection and shoulder $n$ on the swage F, while the upper end of said spring presses up against the lower surface of shoulder and projection $o$ on the inner edge of jaw C, all as fully indicated in the drawings.

The inclined edge $f$ of die F ends at the upper end of a curved part, $p$, against which the point $s$ of the jaw B works when die F is raised by the wedge A', thereby forcing die F back against jaw C, as shown in Fig. 3.

Spring H presses die or swage F down and always keeps its lower end resting on the upper surface of the wedge A', so that when the latter is moved to bring its thin end under the end E spring H presses the latter down close in contact therewith.

By means of the wedge A' the operator adjusts the movable die F to leave the desired space between the surfaces $f$ and $a$ for swaging the teeth of the saw to be operated upon, and holds the wedge in position by the fingers of the hand which grasps and holds the shank or stock A. He then places the device upon the end of the tooth of the saw to be operated upon, the point $d$ of the swage F being in contact with the face of the tooth, when, with the other hand, by a hammer or other suitable instrument, he strikes the end I of shank A, and by which operation the point of the tooth is flattened out and made thin and hard, the point $d$ condensing the metal at the same time it works it down from the body of the tooth and broadens it out to form the point of the tooth. This action of point $d$ also tends to give a hook form to the point of the tooth, which is very desirable, rendering the cut more like the cut of a chisel than a scraping-iron. After the teeth have all been properly swaged, the operator moves wedge A' to bring die or swage F into the position shown in Figs. 1 and 2, and then goes over the teeth again to simply sharpen the points of the teeth, the blow being while the point of the tooth is resting in the angle formed by point $d$ coming in contact with the inclined surface $a$ of jaw B.

Both the tooth swaging and sharpening operation can be performed without removing the saw from its working position in the saw frame or machine, and as the point of the tooth is complete, wide, sharp, and hooked or curved much time is saved in the operation over the old modes, while, as before stated, the teeth last longer, and work better, and, besides, far more work can be accomplished by a saw sharpened by my device than by the old modes. The feed can be much faster. Then, again, the swaging operation is so perfect, making the end of the tooth wide, thin, and hard, that the teeth can be used for a long time by simply subjecting them occasionally to the last or sharpening operation.

It will be understood, of course, that the parts of the device are to be made larger or smaller, as desired, for the particular sized saws to be operated upon.

As hereinbefore indicated, the action of points $d$ works the metal from the face of the tooth back of the point down and out laterally, and also slightly curves or concaves the face off the tooth just back of its point, and this is what causes the tooth to give a chisel-cut.

What I claim, and desire to secure by Letters Patent, is—

1. The combination, with the jaws B and C, of the adjustable die or swage F, provided with point $d$ and rounded or inclined top G, substantially as and for the purposes set forth.

2. The combination, with jaws B and C, jaw B having notch $c$ and point $s$, of die or swage F, provided with curved part $p$, substantially as and for the purposes set forth.

3. The combination, with jaws B C and die F, of spring H and wedge A', substantially as and for the purposes set forth.

4. The combination, with jaws B and C, provided with inclined or beveled surfaces $a$ and $b$, of movable die or swage F, made as described, spring H, wedge A', and clamp D, substantially as and for the purposes set forth.

DANA G. HADLEY.

Witnesses:
THOS. H. DODGE,
WILLIAM C. CURTIS.